United States Patent [19]

Sbalchiero et al.

[11] Patent Number: 5,470,615

[45] Date of Patent: Nov. 28, 1995

[54] BONDING AND COATING METHODS AND APPARATUS FOR TH COILS OF DYNAMO-ELECTRIC MACHINE PARTS

[75] Inventors: Federico Sbalchiero; Marco Carboncini, both of Florence, Italy

[73] Assignee: Axis USA, Inc., Tampa, Fla.

[21] Appl. No.: 209,873

[22] Filed: Mar. 11, 1994

[51] Int. Cl.[6] .............................. B05D 3/02; B05B 5/025
[52] U.S. Cl. .......................... 427/459; 427/475; 427/487; 427/195; 118/624
[58] Field of Search ...................... 427/104, 318, 427/105, 185, 195, 459, 461, 487, 592, 594, 469, 475, 477; 118/624

[56] References Cited

U.S. PATENT DOCUMENTS

3,145,127  8/1964  Baun ............................ 156/73
3,646,374  2/1972  Jordan et al. .................. 310/45
3,660,136  5/1972  Guilbault ....................... 117/17
5,179,910  11/1993  Habsburg-Lothringen ........... 118/634

Primary Examiner—Shrive Beck
Assistant Examiner—Fred J. Parker
Attorney, Agent, or Firm—Fish & Neave; Robert R. Jackson

[57] ABSTRACT

The coils on dynamo-electric machine parts (such as electric motor armatures or stators) are stabilized and coated by electrostatically coating them with resin powder, and then fusing the powder into a continuous resin coating on the coils. For example, the powder may be fused by heat generated by briefly passing a relatively large electrical current through the coils. If desired, the coils may be formed with wire which has an outer layer of bonding material. Activation of the bonding material, which may occur simultaneously with fusing of the resin powder, bonds adjacent coil wires together.

18 Claims, 6 Drawing Sheets

BONDING AND COATING METHODS AND APPARATUS FOR TH COILS OF DYNAMO-ELECTRIC MACHINE PARTS

BACKGROUND OF THE INVENTION

This invention relates to the manufacture of dynamo-electric machines, and more particularly to bonding and coating the coils of dynamo-electric machine parts.

Dynamo-electric machines such as electric motors, generators, and alternators typically have an armature which rotates within a stationary stator. Both the armature and the stator typically have coils of wire wound on or otherwise applied to a ferromagnetic core. For a variety of reasons it may be desirable to solidify and/or coat these coils after they have been wound or otherwise applied. For example, solidification of armature coils may be necessary to prevent the coils from loosening under the influence of the centrifugal force produced when the armature is rotated at high speed during use of the finished dynamo-electric machine. Solidifying stator coils may reduce the adverse effects of vibration. Coating the coils of armatures and/or stators may be needed to help protect them from abrasive or corrosive environments. Solidification and/or coating may also effectively repair any defects that have developed in the insulation of the coil wire during winding of the coils.

Several techniques have been employed for solidifying and coating coils. In the case of stators, for example, the wire used to wind the coils may have a layer of bonding material over the usual insulation material. Then, after the coils have been wound, the bonding material is activated (e.g., by heat). This melts or fuses the bonding layers of adjacent coil wires together. This technique has been used for stators rather than for armatures because of a concern that the known bonding layer materials or the bonds they produce are not strong enough to withstand the centrifugal forces encountered in armatures.

The typical treatment for armature coils is to coat the coils and their leads with impregnation resins and/or gel coat resins. When being applied, impregnation resins have relatively low viscosity and are therefore capable of penetrating into the coils (e.g., by capillarity) where the resins fill the spaces between the wires forming the coils. Impregnation resins are typically applied to the coils in liquid form by dripping or bathing methods. When impregnation resins solidify, their structure is able to hold the coil wires together.

In the region between the commutator and core of an armature the coil leads may be spaced relatively far apart so that an impregnation resin may not be sufficient to anchor the leads. In that event, gel coat resin can be applied. Gel coat resins are a more viscous material capable of forming a self-supporting structure that bonds the wires together and anchors them where they have been located during winding. External coil portions which have already received impregnation resin can also receive gel coat resin. The gel coat forms a continuous, highly resistant outer layer covering the most external wires of the coils. This outer gel coat layer is particularly suitable for protecting the coils from abrasion by particles or other impurities in the air circulating in the final dynamo-electric machine.

To produce impregnation resin coatings, the dynamo-electric machine part to be coated is usually preheated. Then the resin is dripped onto the coils, typically at both ends, the resin penetrating into the coils by capillarity. After application in this way, the resin is cured in an oven. Heatless impregnation resins avoid final oven curing because they are able to gelify at room temperature. Gel coat resin application typically involves steps that are similar to those required for impregnation resins.

Returning to the use of a bonding layer on the wire used to wind stator coils, it is known to activate the material of such a layer by passing a high current for a short period of time through the wound coils in order to heat the bonding layer material by the electrical resistance of the coils. Compacting pressure may be applied to the coils to promote adhesion between the wires. To increase the abrasion resistance of coils with bonding layers, the coils may be coated with powdered resin by placing the dynamo-electric machine part in a fluidized bed of resin powder while the coil wires are still hot from activation of the bonding layer. The resin powder adheres to the still-tacky bonding layer material, thereby coating the coils. Further heating for a longer time out of the fluidized bed (e.g., in an oven) transforms the resin powder into a continuous coating on the coils. This coating renders the stator more suitable for use in an abrasive atmosphere.

All of the above-described coil bonding and coating techniques have significant shortcomings. For example, impregnation and gel coating require the handling and application of liquids which may have limited "pot life". This may mean that if the manufacturing operation has to be interrupted for any reason, the resin waiting to be used may become unusable (e.g., by hardening) and may even render the apparatus which applies it unusable. Thus it may be necessary to construct the resin application apparatus with disposable parts that are completely replaced when any significant interruption of the resin applying operation occurs. Liquid resin techniques also tend to have such other disadvantages as long production times, large manufacturing site requirements for locating coating equipment and possibly also curing equipment, and expensive coating equipment which is delicate and which requires tedious and highly expert adjustment and operation. Liquid resins may also necessitate the provision of large and expensive installations for capturing and recovering volatile components of the resins in order to avoid unacceptable pollution of the environment.

The above-described bonding layer techniques avoid many of the foregoing problems if used alone, but by itself bonding layer technology tends to produce only relatively weak bonds.

In view of the foregoing, it is an object of this invention to improve and simplify bonding and/or coating of the coils of dynamo-electric machine parts.

It is a more particular object of this invention to provide methods and apparatus for bonding and/or coating the coils of dynamo-electric machine parts, which methods and apparatus are (1) relatively compact and inexpensive, (2) easy to operate, and (3) characterized by short cycle times.

It is still another more particular object of this invention to provide methods and apparatus for bonding and/or coating the coils of dynamo-electric machine parts, which methods and apparatus reduce or eliminate the need to handle liquid resins.

SUMMARY OF THE INVENTION

These and other objects of the invention are accomplished in accordance with the principles of the invention by using electrostatic attraction to cover the coils of a dynamo-electric machine part with resin powder particles. For example, a dynamo-electric machine part may be placed in a fluidized bed of electrostatically charged resin powder particles, while an electrical potential which is attractive to the charge on those particles is applied to the coils. This causes the resin powder to cover all exposed surfaces of the coils. Thereafter, the resin powder is activated to cause the individual particles to fuse together into a continuous coating over the coils. This may be accomplished, for example, by briefly passing a large electrical current through the coils to cause them to heat up and melt the resin in the powder. If necessary or desired, further curing of the resin coating may be accomplished by exposing the dynamo-electric machine part to a curing agent (e.g., heat in an oven). The finished resin coating solidifies or helps to solidify the coils, as well as providing a hard and continuous protective coating over the outside of the coils.

If it is desired to both bond and coat the coils in accordance with this invention, the coils may be produced using wire which has on it an outer layer of bonding material. Then the above-described electrostatic powder coating technique is used to add a coating of resin powder to the coils. Activation of the bonding layer material and the resin powder produces coils which are both internally bonded and externally coated. Preferably, the bonding layer material and the resin powder are both activated simultaneously to produce an extremely short and efficient cycle time for the combined bonding and coating operation. This may be accomplished, for example, by briefly passing a large electrical current through the coils to heat the coils and thereby simultaneously melt both the bonding layer material and the resin powder. If necessary or desired, further curing of the bonding layer material and the resin from the powder may be subsequently performed (e.g., by further heating of the dynamo-electric machine part in an oven). The finished resin coating reinforces the coil-solidifying effect of the bonding material, as well as providing the above-described hard and continuous protective coating over the outside of the coils.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
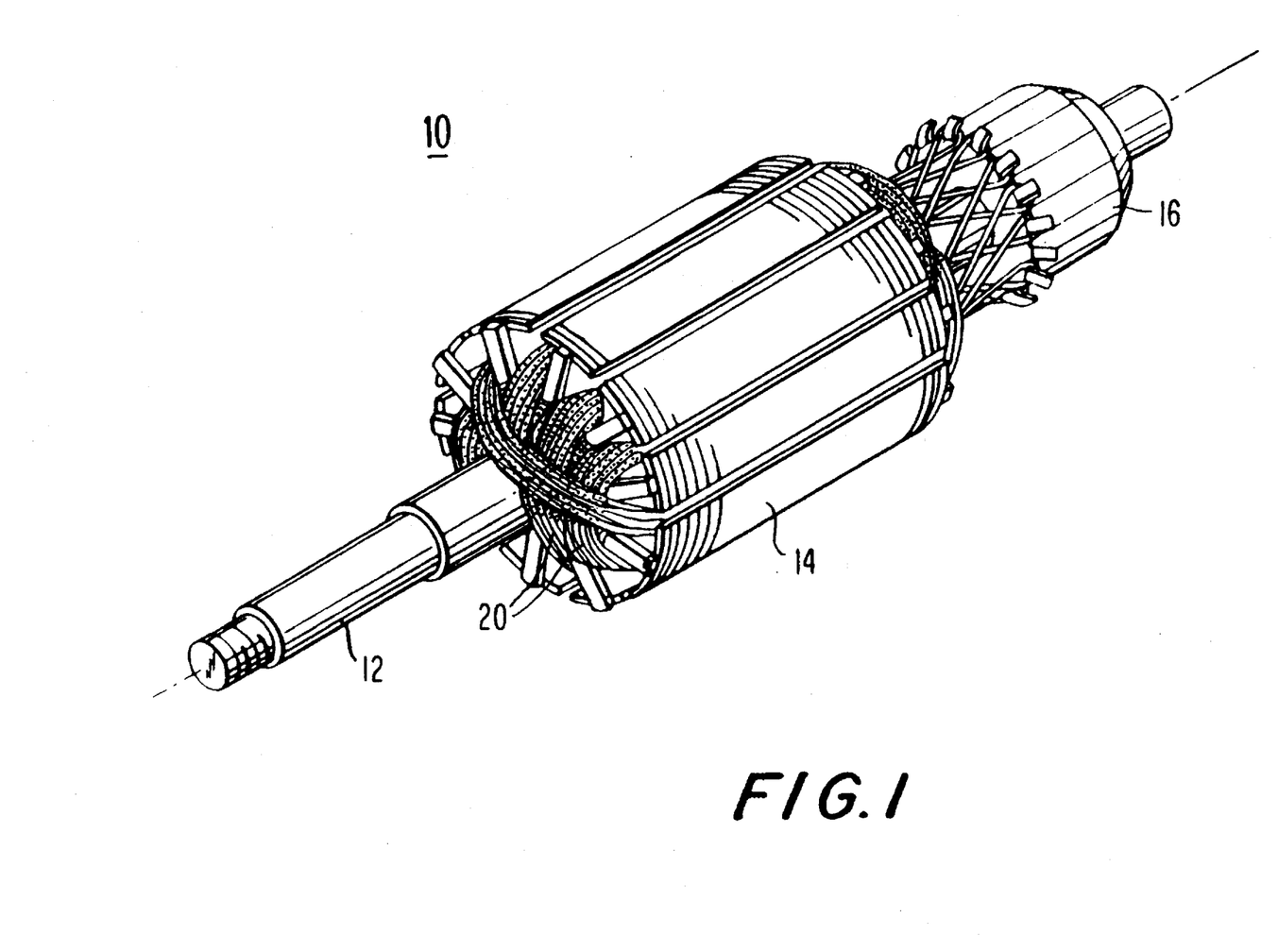
FIG. 1 is a perspective view of an illustrative dynamo-electric machine part made in accordance with this invention. A portion of the outer resin coating has been removed in FIG. 1 to reveal the underlying structure.
Figure 2:
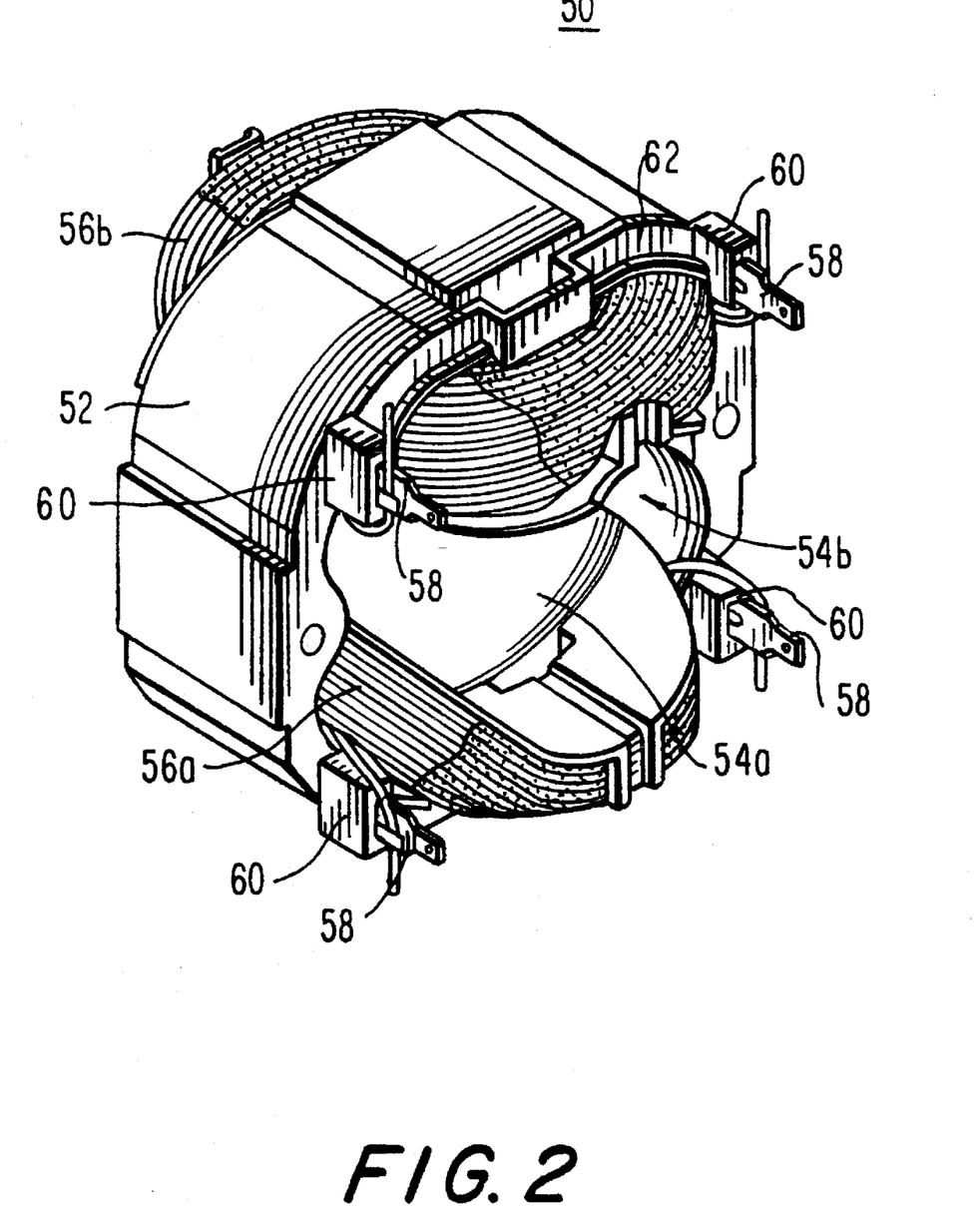
FIG. 2 is a perspective view of another illustrative dynamo-electric machine part made in accordance with this invention. Again, portions of the outer resin coating have been removed to reveal the underlying structure.

FIGS. 1 and 2 show examples of dynamo-electric machine parts having coils that have been coated, and possibly also bonded, in accordance with this invention. In each of these FIGURES some of the coating has been removed to show the underlying coil structure. FIG. 1, for example, shows an illustrative electric motor armature 10 which includes a shaft 12, a ferromagnetic core 14 mounted concentrically on the shaft, and a commutator 16 also mounted concentrically on the shaft. Coils 20 of wire have been conventionally wound on core 14. Thus, most of the wire of each coil has been deposited in a pair of axially extending slots cut radially into the outer periphery of core 14, although portions of each coil are also exposed along the opposite axial end faces of the core, and coil leads extend to commutator 16 where they have been fused to the commutator.

FIG. 2 shows an illustrative electric motor stator 50 having a hollow, annular body 52 of ferromagnetic material. Body 52 has two diametrically opposite, radially inwardly extending poles 54a and 54b. A coil of wire 56a or 56b is conventionally wound, respectively, on each pole. Coil lead wires extend to terminals 58 mounted in sockets 60 in an electrically insulating terminal board 62 on one axial end of stator body 52.

Figure 3:
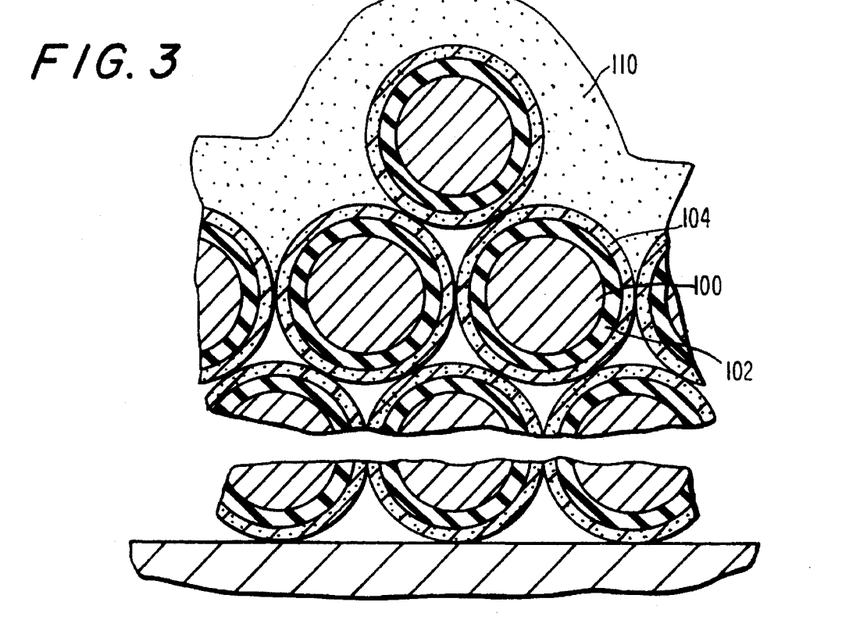
FIG. 3 is a simplified, partial, cross sectional view of an illustrative coil during processing in accordance with this invention.

In accordance with a particularly preferred embodiment of the present invention, coils 20 in FIG. 1 or 56 in FIG. 2 are wound using wire that has an outer layer of bonding material over the normal insulating layer. For example, FIG. 3 shows a cross section of any such coil. The metal core 100 of the wire is surrounded first by conventional insulation 102. This in turn is surrounded by a layer 104 of bonding material. Such wire is, per se, known, and it has been used in the past for stator coils as is discussed in the background section of this specification.

Figure 4:
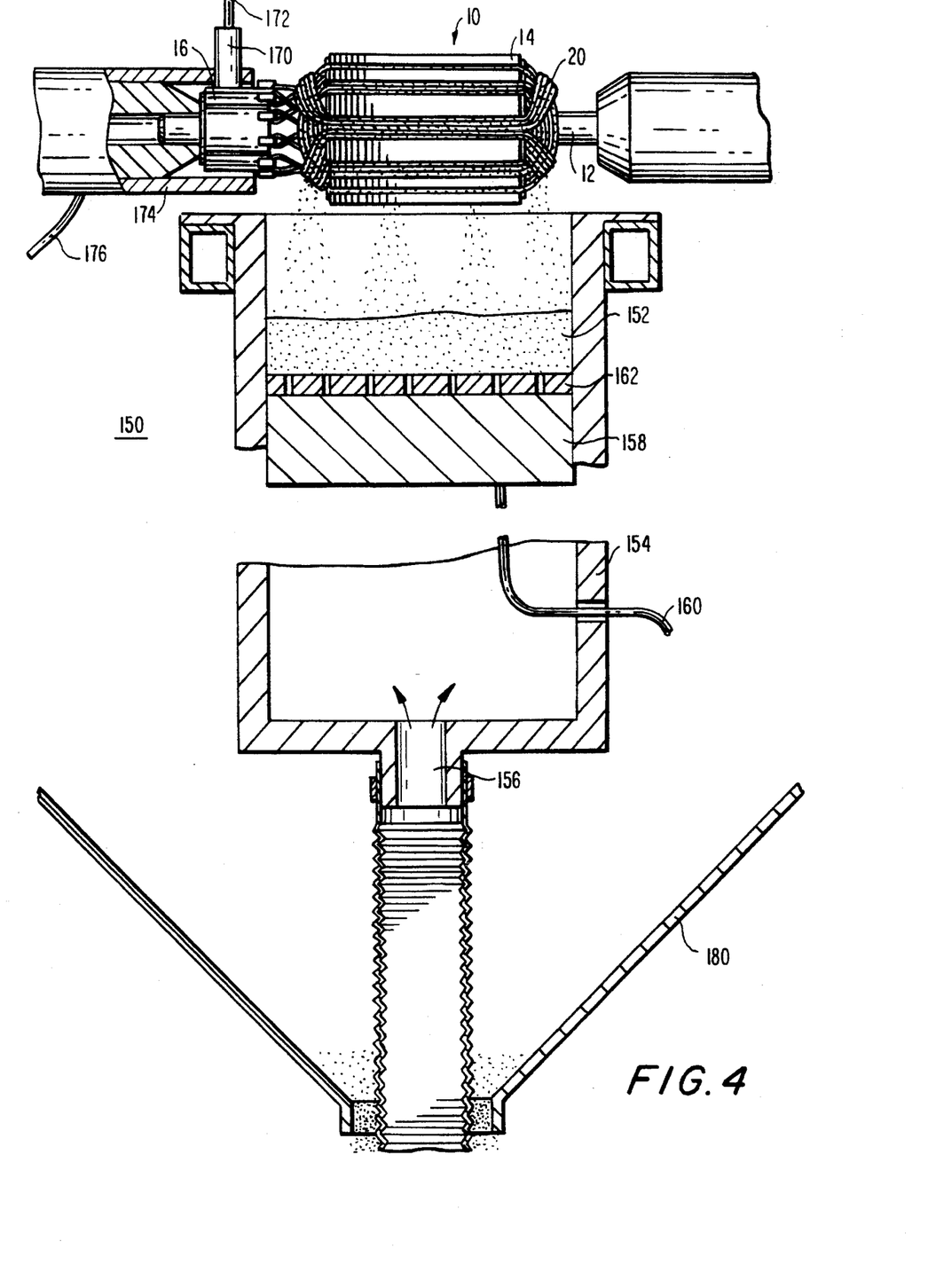
FIG. 4 is a simplified elevational view, partly in section, of illustrative resin powder coating apparatus in accordance with this invention.

After coils 20 or 56 have been wound, they are electrostatically coated with resin powder 110 as shown, for example, in FIG. 3. FIG. 4 shows illustrative apparatus 150 for performing such electrostatic coating on armature 10. In this apparatus armature 10 is disposed above a fluidized bed 152 of electrostatically charged resin powder. Compressed air is forced up into the lower part of housing 154 via conduit 156. The air flows upward past electrode 158 in housing 154. Electrode 158 is connected to a source of electrical potential via lead 160. For example, lead 160 may connect electrode 158 to a positive potential source. Accordingly, the air is ionized as it passes electrode 158. Above the electrode the air passes through porous plate 162 which supports the resin powder in fluidized bed 152. The upward flow of ionized air fluidizes and electrostatically charges the resin powder.

As has been mentioned, armature 10 is supported above fluidized bed 152. Electrode 170 makes contact with commutator 16. Lead 172 connects electrode 170 to a source of electrical potential that attracts the electrostatically charged particles in fluidized bed 152. For example, if lead 160 is connected to positive potential, lead 172 may be connected to ground potential or to negative potential. This places armature coils 20 at ground or negative potential. Because the electrical potential of coils 20 is attractive to the charged resin powder particles, those particles cover all exposed parts of the coils. This includes the leads to commutator 16, the axial ends of the coils, and even the radially outer surfaces of the coils in the slots in core 14. Armature 10 may be rotated about the axis of shaft 12 during this operation to help promote uniform powder coating of the coils. Shield 174 covers most of commutator 16 to prevent or at least reduce powder coating of the main portion of the commutator. If desired, shield 174 may be connected via lead 176 to a source of electrical potential which does not attract or which even repels resin powder articles from bed 152. For example, lead 176 may be connected to a potential having the same polarity relative to ground as the potential applied to lead 160. The potential applied to shield 174 may be conducted through the armature supporting structure to armature shaft 12 and core 14 to help reduce or prevent, or to subsequently reverse, the deposit of resin powder particles on those portions of the armature. Excess powder particles that escape from fluidized bed 152 but that do not adhere to armature coils 20 are collected by outer enclosure 180 and are eventually recycled.

Although FIG. 4 shows only armature 10 being electrostatically coated, it will be readily apparent how this FIGURE can be adapted for coating other parts such as stator 50. Again, the stator is supported above the fluidized bed. The coils 56 of the stator are connected (via terminals 58) to a potential which is attractive to the electrostatically charged resin powder particles in the bed. The charged powder particles therefore cover all exposed portions of coils 56. Terminals 58 are shielded to keep powder particles from depositing on them. Stator body 52 may also be connected to a potential source (e.g., a source having the same polarity as the source connected to electrode 158) to help reduce or to subsequently reverse any unwanted deposit of powder particles on body 52. Stator 50 may be rotated over the fluidized bed to promote uniform deposit of powder on coils 56. In short, all of the principles discussed above in connection with electrostatic powder coating of the coils of armature 10 are equally applicable to coating the coils of other types of dynamo-electric machine parts such as stator 50.

Figure 5:
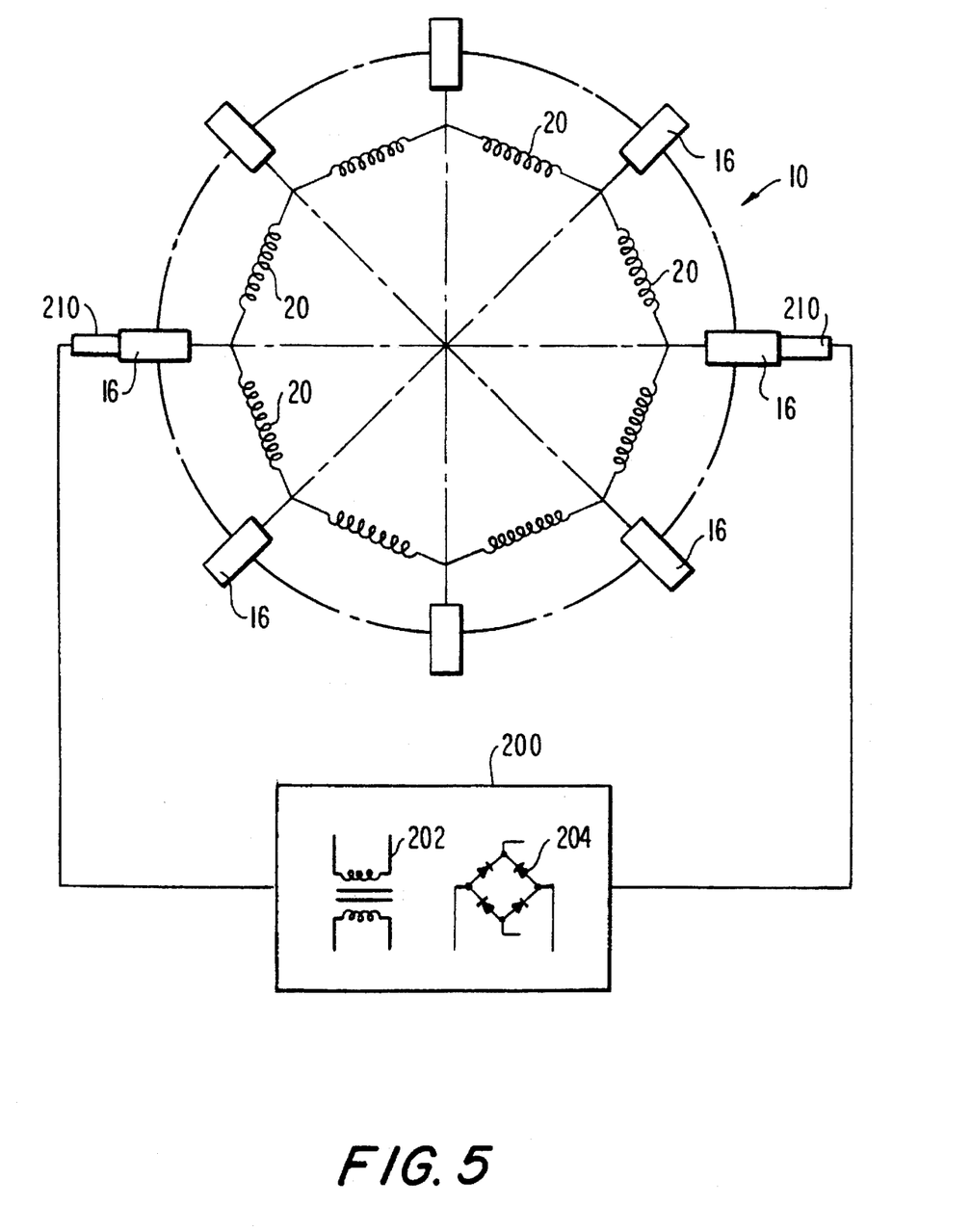
FIG. 5 is a simplified, schematic diagram of illustrative coil heating apparatus in accordance with this invention.
Figure 6:
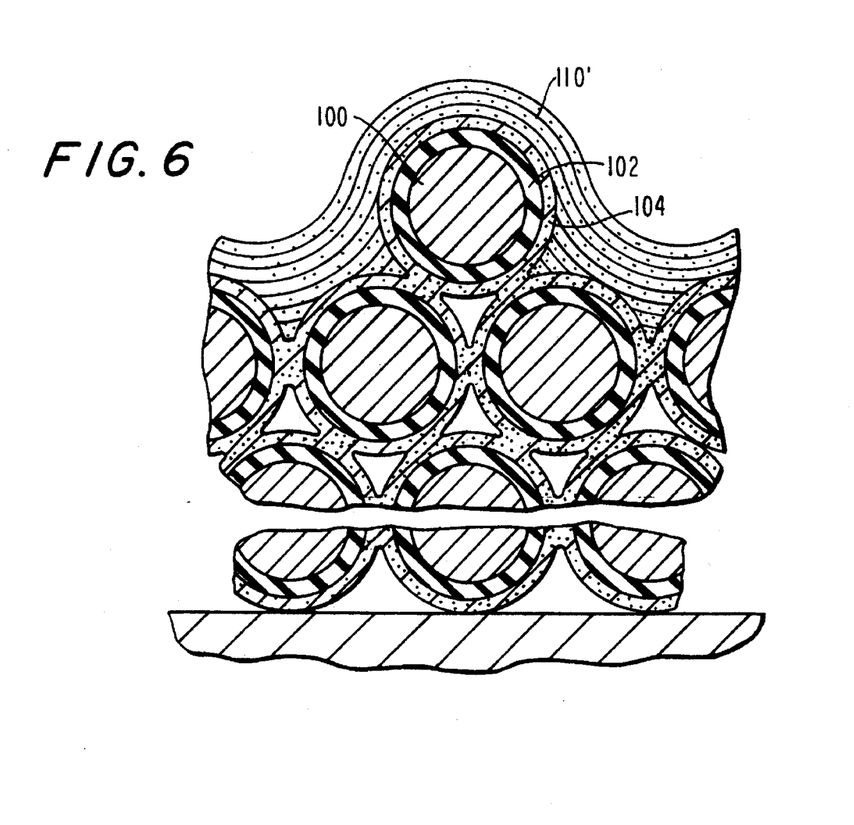
FIG. 6 is a view similar to FIG. 3, but showing a later stage in the processing of an illustrative coil in accordance with this invention.

After the coils of the dynamo-electric machine part have been electrostatically coated with resin powder as described above and as shown generically at 110 in FIG. 3, bonding layer 104 and powder coating 110 are activated by exposing them to an activating agent. In the depicted preferred embodiment the activating agent is heat and the source of this heat is a relatively large electrical current that is passed briefly through the coils. For example, FIG. 5 shows illustrative apparatus for accomplishing this for armature 10. Power supply 200 includes a transformer 202 and full wave rectifier 204 for converting commercially available alternating current to a desired level of direct current. This direct current is applied via electrodes 210 to two diametrically opposite commutator bars 16 of armature 10. The coils 20 of the armature form two series networks between these commutator bars. Accordingly, direct current from power supply 200 passes through all of coils 20. The magnitude of this current is sufficient to heat the coils, thereby heating bonding layer 104 on the coil wires, as well as the resin powder 110 which covers the external portions of the coils. This heat activates the bonding layer material and causes that material on adjacent wires to melt or fuse together as shown in FIG. 6. The heat from wires 100 also activates the resin in powder coating 110. This causes the powder particles to melt or fuse together into a smooth and continuous coating 110' over the surface of the coils as is also shown in FIG. 6. It will be apparent from FIG. 6 how resin coating 110' reinforces the coil-solidifying effect of bonding material 104, as well as giving the coil an abrasion-resistant outer coating.

Although FIG. 5 shows applying current to the coils of an armature, it will be readily apparent to those skilled in the art how current can similarly be applied to coils of other dynamo-electric machine parts such as stator 50. For example, electrodes 210 can be connected to the terminals 58 at respective opposite ends of stator coils 56. As described above, the resulting relatively high current passing through coils 56 heats those coils and activates coil coatings 104 and 110.

Any of several techniques can be used for controlling power supply 200 to apply only approximately the amount of energy required to suitably activate materials 104 and 110. For example, power supply 200 can be turned off after it has applied a predetermined amount of power for a predetermined period of time. Or power supply 200 can measure, on an on-going basis, the resistance of the coil circuit between electrodes 210, and can shut off the applied power when that resistance has increased to a predetermined level or by a predetermined percentage of the initial resistance, thereby indicating that coil wires 100 have reached a predetermined temperature. As still another possibility, the temperature of the coils can be measured more directly (e.g., with an infra-red temperature sensor that is aimed at the coil region) in order to determine when the coils have been heated sufficiently and the power can accordingly be turned off.

If desired, materials 104 and 110 can be activated by means other than those described above. For example, externally applied heat can be used. Or chemical atmosphere activation can be used. The electrically heated coil technique described above is, however, believed to have several advantages. It tends to be extremely fast and uniform everywhere in and on the coils. It is also localized to the coils, which means that resin powder deposited elsewhere on the dynamo-electric machine part tends not be activated, but instead remains in the form of a powder which can be easily brushed or blown off the part after the activation step.

After the activation step described above (and after any extraneous coating material has been removed (e.g., as described at the end of the preceding paragraph)), it may be necessary or desirable to subject the dynamo-electric machine part to further operations to finally cure one or both of materials 104 and 110. For example, it may be necessary to place the parts in an oven or to otherwise heat them for a predetermined time to finally cure resin coating 110'.

Although in the particularly preferred embodiments described above the coils are formed using wire which has an outer layer 104 of bonding material, it will be understood that such material can be omitted if desired. The features of the invention pertaining to electrostatically charged resin powder coating of coils can thus be used alone or in combination with other known coil bonding and/or coating techniques.

Figure 7:
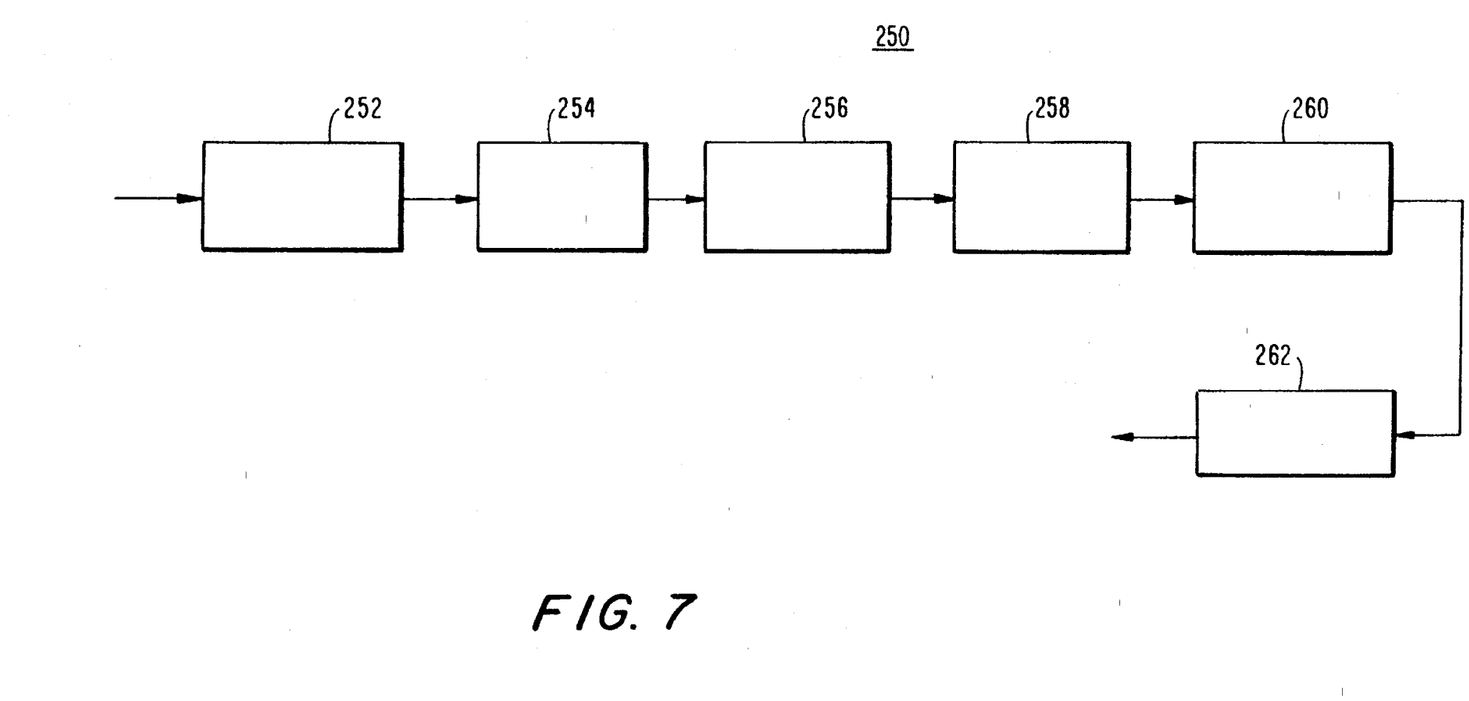
FIG. 7 is a simplified block diagram of an illustrative production line for dynamo-electric machine parts in accordance with this invention.

FIG. 7 shows an illustrative assembly line 250 for producing dynamo-electric machine parts in accordance with this invention. In station 252 conventional apparatus is used to wind or otherwise apply coils such as 20 or 56 on each part. As described above, the coil wire used may include an outer bonding layer 104. In station 254 conventional apparatus is used to terminate the coil leads. For example, station 254 may include conventional apparatus for fusing armature coil leads to bars of commutator 16 or for fusing stator coil leads to terminals 58. At station 256 the coils are electrostatically coated with resin powder (e.g., using apparatus of the type shown in FIG. 4). At station 258 the bonding layer material 104 (if present) and resin powder coating 110 are activated (e.g., using apparatus of the type shown in FIG. 5). At station 260 any excess resin is removed (e.g., by brushing or blowing off unactivated resin powder). At station 262 final curing is performed (e.g., by heating each part to a predetermined resin curing temperature for a predetermined time).

Although other suitable materials may be used if desired, a typical material for bonding layer 104 is a polyamide requiring a temperature in the range from about 180° C. to about 200° C. to achieve adhering action. The powder resin 110 may be an epoxy resin which activates at a temperature in the range from about 170° C. to about 200° C.

From the foregoing it will be appreciated that the present invention offers numerous advantages over conventional liquid resin coating techniques. For example, the above-described difficulties associated with handling liquid resins are eliminated. Electrostatic powder coating apparatus such as is shown in FIG. 4 can be made much more compact and reliable than liquid coating apparatus. It can also be made to operate much more rapidly than prior art liquid dripping apparatus. Activation apparatus such as is shown in FIG. 5 can also be made to operate extremely rapidly, especially in view of the fact that it simultaneously activates both any bonding layer material 104 and the powder coating 110. As compared to liquid resin techniques, the techniques of this invention tend to produce armatures which are better balanced about their shafts. This is so because resin powder tends to deposit more uniformly than liquid resins, which randomly penetrate the coils to which they are applied.

It will be understood that the foregoing is only illustrative of the principles of the invention, and that various modifications can be made by those skilled in the art without departing from the scope and spirit of the invention. For example, although the invention has been primarily described and illustrated with reference to electric motor armatures and stators, it will be readily apparent how it can be applied to the generally similar parts of other types of dynamo-electric machines such as generators and alternators. Similarly, although the coils are generally referred to herein as having been wound on the dynamo-electric machine part, it will be understood that they can be applied to the part by other conventional means such as by winding them on a separate form and then transferring them to the part.

The invention claimed is:

1. The method of coating a coil of wire formed on a ferromagnetic core of a dynamo-electric machine part, said coil being formed on said core so that part of the surface of said coil is exposed and so that part of the surface of said core is also exposed, said method comprising the steps of:

exposing said dynamo-electric machine part to electrostatically charged resinous powder particles;

applying different first and second electrical potentials to said coil and said core, respectively, said first electrical potential being selected relative to the electrostatic charge on said particles so that said particles are electrostatically attracted to and coat said exposed surface of said coil, and said second electrical potential being selected relative to the electrostatic charge on said particles to substantially avoid electrostatic retention of said particles on said exposed surface of said core; and treating the particles coating said exposed surface of said coil to cause said particles to fuse into a substantially continuous resinous coating on said exposed surface of said coil.

2. The method defined in claim 1 wherein said resinous powder particles are electrostatically charged with a first polarity relative to ground potential, and wherein said first electrical potential is selected from the group consisting of ground potential and an electrical potential having polarity relative to ground potential which is opposite to said first polarity.

3. The method defined in claim 2 wherein said second electrical potential has said first polarity relative to ground potential.

4. The method defined in claim 1 wherein said exposing step comprises the step of:

placing said dynamo-electric machine part in a fluidized bed of said electrostatically charged resinous powder particles.

5. The method defined in claim 1 wherein said treating step comprises the step of:

passing an electrical current through said coil to heat said coil and to thereby heat said resinous powder particles.

6. The method defined in claim 1 further comprising the step of:

applying a subsequent final curing treatment to said resinous coating.

7. The method defined in claim 6 wherein said step of applying a final curing treatment comprises the step of:

heating said dynamo-electric machine part.

8. The method defined in claim 1 wherein said coil is formed of wire coated with a layer of bonding material, and wherein said method further comprises the step of:

treating said bonding material to cause said bonding material on adjacent wires in said coil to bond said adjacent wires together.

9. The method defined in claim 8 wherein said step of treating said bonding material comprises the step of:

passing an electrical current through said coil to heat said coil and to thereby heat said bonding material.

10. The method defined in claim 8 wherein said step of treating said bonding material simultaneously performs said step of treating said resinous powder particles.

11. Apparatus for coating a coil of wire formed on a ferromagnetic core of a dynamo-electric machine part, said coil being formed on said core so that part of the surface of said coil is exposed and so that part of the surface of said core is also exposed, said apparatus comprising:

means for exposing said dynamo-electric machine part to electrostatically charged resinous powder particles;

means for applying different first and second electrical potentials to said coil and said core, respectively, said first electrical potential being selected relative to the electrostatic charge on said particles so that said particles are electrostatically attracted to and coat said exposed surface of said coil, and said second electrical potential being selected relative to the electrostatic charge on said particles to substantially avoid electrostatic retention of said particles on said exposed surface of said core; and means for treating the particles coating said exposed surface of said coil to cause said particles to fuse into a substantially continuous resinous coating on said exposed surface of said coil.

12. The apparatus defined in claim 11 wherein said resinous powder particles are electrostatically charged with a first polarity relative to ground potential, and wherein said first electrical potential is selected from the group consisting of ground potential and an electrical potential having polarity relative to ground potential which is opposite to said first polarity.

13. The apparatus defined in claim 12 wherein said second electrical potential has said first polarity relative to ground potential.

14. The apparatus defined in claim 11 wherein said means for exposing comprises:

means for producing a fluidized bed of said electrostatically charged resinous powder particles; and means for supporting said dynamo-electric machine part adjacent to said fluidized bed so that resinous powder particles from said fluidized bed are electrostatically attracted to and coat said exposed surface of said coil.

15. The apparatus defined in claim 11 wherein said means for treating comprises:

means for passing an electrical current through said coil to heat said coil and to thereby heat said resinous powder particles.

16. The apparatus defined in claim 11 further comprising:

means for applying a final curing treatment to the resin from said resinous powder after treatment by said means for treating.

17. The apparatus defined in claim 16 wherein said means for applying a final curing treatment comprises:

means for heating said dynamo-electric machine part.

18. The apparatus defined in claim 11 wherein said coil is formed of wire coated with a layer of bonding material, and wherein said means for treating said resinous powder particles simultaneously treats said bonding material to cause said bonding material on adjacent wires to bond said adjacent wires together.

* * * * *